(12) United States Patent
Kobayashi

(10) Patent No.: US 10,527,813 B2
(45) Date of Patent: Jan. 7, 2020

(54) OPTICAL PART AND METHOD FOR MANUFACTURING OPTICAL PART

(71) Applicant: CANON KABUSHIKI KAISHA, Tokyo (JP)

(72) Inventor: Daigo Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 15/660,582

(22) Filed: Jul. 26, 2017

(65) Prior Publication Data

US 2018/0031796 A1    Feb. 1, 2018

(30) Foreign Application Priority Data

Jul. 29, 2016  (JP) .................................. 2016-150333
Jun. 30, 2017  (JP) .................................. 2017-129346

(51) Int. Cl.
*G02B 7/02* (2006.01)
*B29D 11/00* (2006.01)
*G02B 1/04* (2006.01)
*G02B 27/00* (2006.01)

(52) U.S. Cl.
CPC .......... *G02B 7/02* (2013.01); *B29D 11/00009* (2013.01); *G02B 1/041* (2013.01); *G02B 27/0018* (2013.01)

(58) Field of Classification Search
CPC ....... G02B 7/02; G02B 1/041; G02B 27/0018
See application file for complete search history.

(56) References Cited

U.S. PATENT DOCUMENTS

2014/0334019 A1*  11/2014  Ishiguri ................. G02B 1/041
                                                           359/738

FOREIGN PATENT DOCUMENTS

JP            2002-148501 A        5/2002

* cited by examiner

*Primary Examiner* — Joseph P Martinez
(74) *Attorney, Agent, or Firm* — Canon U.S.A. Inc., IP Division

(57) ABSTRACT

A plastic lens is fixed by a holder biting into the plastic lens, a side surface of the plastic lens has a gate trace, and a bite amount into the plastic lens of the holder closest to the gate trace is smaller than an average bite amount into the plastic lens of the holder.

9 Claims, 5 Drawing Sheets

OPTICAL PART AND METHOD FOR MANUFACTURING OPTICAL PART

BACKGROUND OF THE INVENTION

Field of the Invention

The present disclosure relates to an optical part and a manufacturing method of an optical part, and for example, relates to an optical part which is a plastic lens with a holder used for a finder of a digital single lens reflex camera, and a method for manufacturing the optical part.

Description of the Related Art

The plastic lenses are used in a wide range of applications, such as taking lenses of digital cameras, recording and reproducing pickup lenses of optical disks, lenses for projection of projectors, and the like. Many of these plastic lenses are manufactured by injection molding for cost reduction. In order to assemble the plastic lens as a part in a product and make the plastic lens function, in a subsequent process, the lens may be integrated into a frame-shaped lens holder. The lens holder is also called a lens barrel, but herein, the lens holder is denoted as a holder in a unified manner. The holder may have a function of performing easy assembly to the camera, a driving part for moving the lens and light shielding (mask) for suppressing ghost due to lens side reflection.

In order to fix and integrate the lens in the holder, an adhesive is generally used. However, the cost of the post-process called adhesion is a problem. In order to eliminate the bonding process, a method of forming an undercut shape on the inner periphery of the holder and inserting into a mold and molding a lens by casting molten plastic into the mold is also used. If an undercut shape is formed in the holder, the molten plastic reaches an undercut shaped portion. When the molten plastic solidifies in this state, the optical part that is a lens with a holder can be removed from the mold with the lens fixed to the holder and integrated.

Japanese Patent Laid-Open No. 2002-148501 describes that the undercut shape portion for fixing a lens is formed on the inner periphery of a plastic holder, and a plastic lens is molded in a state where this holder is inserted in a mold.

In the method described in Japanese Patent Laid-Open No. 2002-148501, before the molten plastic for molding the lens reaches the undercut shaped portion formed in the holder, the holder may deform due to pressure and heat received from the molten plastic. Since the shape after deformation differs from shot to shot, the accuracy of the molded product becomes unstable, the surface accuracy of the lens is not stabilized, and the quality varies.

SUMMARY OF THE INVENTION

An optical part of the present disclosure includes: a plastic lens having a side surface connecting a first optical surface and a second optical surface, between the first optical surface and the second optical surface; and a holder, wherein: the plastic lens is fixed by the holder biting into the side surface, the side surface has a gate trace, and a bite amount into the side surface of the holder closest to the gate trace is smaller than an average bite amount into the side surface of the holder.

A method for manufacturing an optical part of the present disclosure includes: inserting a holder in a mold; injecting molten resin from a gate into a cavity; and molding a lens, wherein: the cavity has a side surface for transferring a first optical surface, a second optical surface, and a side surface connecting the first optical surface and the second optical surface, the gate is formed on the side surface, and the insertion of the holder is performed so that a protrusion amount of a portion of the holder closest to the gate is smaller than an average of the protrusion amount.

According to the present disclosure, an optical part in which a holder and a lens are integrated can be obtained at a low cost with high accuracy.

Further features of the present disclosure will become apparent from the following description of exemplary embodiments (with reference to the attached drawings).

BRIEF DESCRIPTION OF THE DRAWINGS

FIGS. 1A to 1F each illustrate an optical part according to an example embodiment, in which FIG. 1A is a top perspective view, FIG. 1B illustrates a bottom perspective view, FIG. 1C is a top view, FIG. 1D is a gate anti-gate cross-sectional view, FIG. 1E is an enlarged view of a biting portion, and FIG. 1F is a cross sectional view in a direction perpendicular to the gate.

FIGS. 5A to 5F each illustrate an optical part according to another example embodiment, in which FIG. 5A is a top perspective view, FIG. 5B is a bottom perspective view, FIG. 5C is a top view, FIG. 5D is a gate anti-gate cross-sectional view, FIG. 5E is an enlarged view of a biting portion, and FIG. 5F is a cross sectional view in a direction perpendicular to the gate.

DESCRIPTION OF THE EMBODIMENTS

Figure 1A:
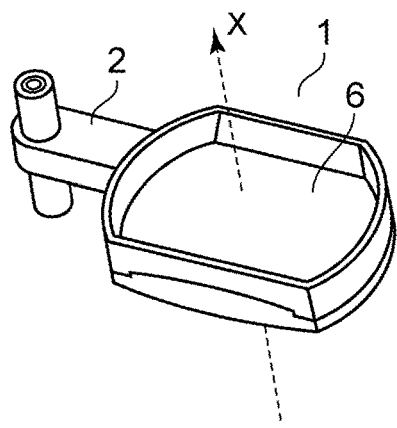
Figure 1B:
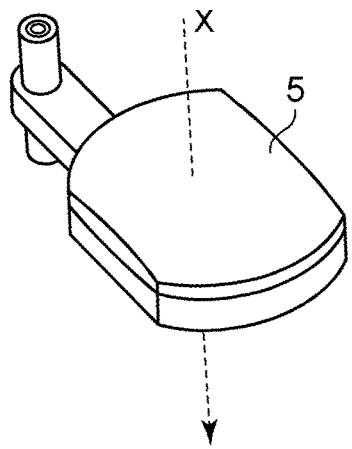
Figure 1C:
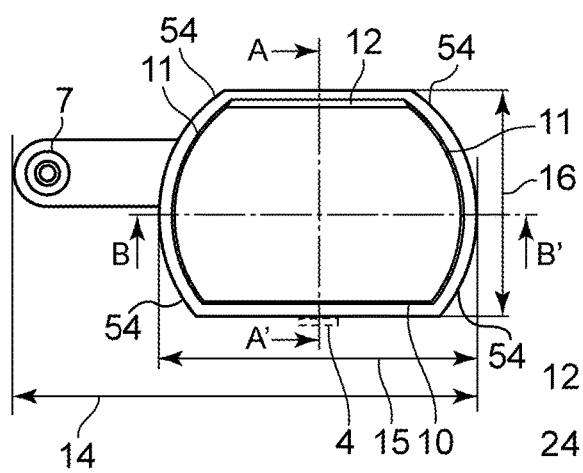
Figure 1D:
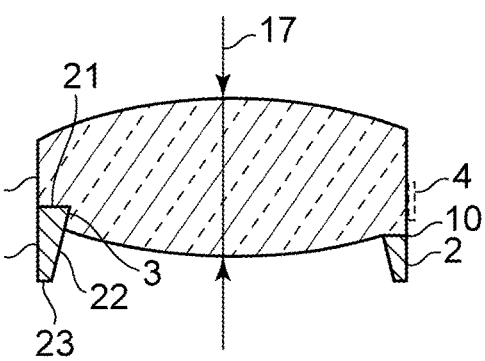
Figure 1E:
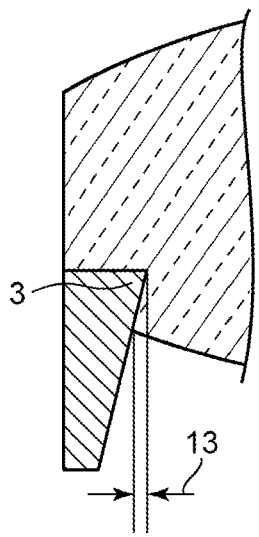
Figure 1F:
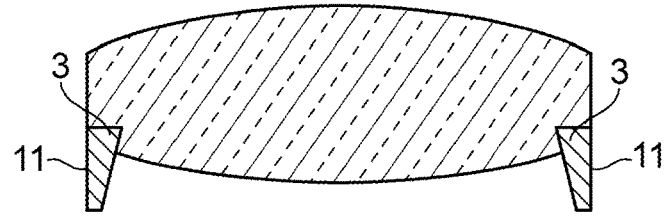

An example of the optical part is illustrated in FIGS. 1A to 1F. FIGS. 1A to 1F each illustrate an optical part according to an example embodiment. FIG. 1A is a top perspective view. FIG. 1B is a bottom perspective view. FIG. 1C is a top view. FIG. 1D is a cross-sectional view taken along a line A-A' cut along a plane including the lens optical axis and parallel to the optical axis. FIG. 1E is an enlarged view of a biting portion. FIG. 1F is a cross-sectional view taken along a line B-B', which is different from FIG. 1D cut along a plane including the lens optical axis and parallel to the optical axis.

In FIGS. 1A to 1F, a reference numeral 1 denotes a plastic lens, a reference numeral 2 denotes a holder, a reference numeral 21 denotes a bottom surface of the holder, a reference numeral 22 denotes an inner surface of the holder, a reference numeral 23 denotes an upper surface of the holder, and a reference numeral 24 denotes an outer surface of the holder. A reference numeral 3 denotes a biting portion, a reference numeral 4 denotes a gate portion, a reference numeral 5 denotes a first optical surface (front), a reference numeral 6 denotes a second optical surface (back), and a reference numeral 7 denotes a reference hole for positioning with other parts provided in the holder. X indicates an optical axis direction. The shapes of the first optical surface (front) 5 and the second optical surface (back) 6 are not particularly limited, such as a spherical surface, an aspherical surface, and a free curved surface. The first optical surface (front) 5 and the second optical surface (back) 6 may be either a front surface or a back surface. That is, the reference numeral 6 may be the first optical surface (front) and the reference numeral 5 may be the second optical surface (back).

It is preferable that the plastic lens is rectangular. In the present specification, a rectangle is defined as a shape in which a cross sectional shape of a plastic lens in a direction perpendicular to an optical axis direction is a rectangular shape, a square shape, a rectangular shape or a shape in which a corner of a square shape is cut out, or a shape in which a part of a circular shape or an elliptical shape is cut out (D-cut shape). In this example embodiment, as illustrated in FIGS. 1A to 1F, an example of the optical part having the plastic lens in which two portions of a circular shape are cut out is illustrated.

The plastic lens of the optical part of the example embodiment has a plurality of side surfaces connecting the first optical surface and the second optical surface, between the first optical surface and the second optical surface. A reference numeral 10 is a side surface on which a gate for molding a plastic lens is arranged among a plurality of side surfaces, as will be described in detail later. That is, among the plurality of side surfaces of the plastic lens, the side surface 10 is a side surface having a gate trace. That is, among the plurality of side surfaces of the plastic lens, a reference numeral 11 is a side surface adjacent to a side surface having a gate trace. That is, among the plurality of side surfaces of the plastic lens, a reference numeral 12 is a side surface opposite to the side surface having a gate trace. A reference numeral 13 indicates the bite amount into a plastic lens on a holder inner surface 22 as viewed from an optical axis direction. A reference numeral 14 denotes a width in a longitudinal direction of the optical part. A reference numeral 15 denotes a width in a longitudinal direction of the plastic lens. A reference numeral 16 denotes a width in a lateral direction of the optical part. A reference numeral 17 denotes a thickness on an optical axis of the plastic lens. The holder 2 and the plastic lens 3 cause the biting portion provided in a part of the holder inner surface 22 to bite into the plastic lens 1, whereby the optical part 1 is integrated. The bite amount 13 of the biting portion 3 differs depending on the side surface of the plastic lens and the biting amount into the side surface 10 having the gate trace is smaller than the biting amount into the side surface 11 adjacent to the side surface having the gate trace. Further, the bite amount into the side surface 10 having the gate trace may be zero. That is, the holder does not have to bite into the side surface 10 having the gate trace.

The optical part illustrated in this example embodiment is, for example, a lens constituting a finder of a digital single lens reflex camera and used as a diopter adjusting lens. That is, the plastic lens is an eyepiece lens and has an eyepiece side lens surface and an objective side lens surface. Then, the holder bites into the eyepiece side lens surface.

In the example embodiment, the case where the plastic lens of the optical part is a rectangle has been described, but the plastic lens may not be rectangular. For example, the plastic lens may be circular.

In other words, the plastic lens of the optical part has a side surface connecting the first optical surface and the second optical surface, between the first optical surface and the second optical surface. The bite amount 13 of the biting portion 3 which is a part of the inner surface of the holder is not uniform and has a portion in which the bite amount 13 is different. The bite amount into the lens of the holder closest to the gate for molding the plastic lens, which is formed on the side surface of the plastic lens, is smaller than the average bite amount into the lens of the holder. In other words, the bite amount into the lens on the inner surface of the holder closest to the gate trace is smaller than the average bite amount into the lens on the inner surface of the holder. Also, the bite amount of the holder closest to the gate trace into the lens may be zero. In other words, the inner surface of the holder closest to the gate trace need not bite into the lens. In the present specification, the average of the bite amount into the plastic lens of the holder is defined as a value obtained by dividing the total area of the inner surface of the holder biting into the plastic lens by the length of the outer periphery of the cross sectional shape of the plastic lens in the direction perpendicular to the optical axis direction. The cross sectional shape of the plastic lens at this time is defined as a cross sectional shape passing through the center on the optical axis of the plastic lens (half point of the thickness on the optical axis). In the case where there is the gate trace at the center on the optical axis of the plastic lens, the length is the outer periphery of the cross sectional shape excluding the gate trace. The area of the holder biting into the plastic lens refers to the total area of the portion where the inner surface of the holder is in contact with the lens, indicated as the bite amount 13 of the holder into the plastic lens as viewed from the optical axis direction. In the present specification, a plastic lens may be simply referred to as a lens in some cases.

It is desirable that the material of the holder 2 is higher in heat resistance than the lens material. For example, a material containing 50% by weight or more of polycarbonate is preferable. As will be described in detail later, in a state where the holder 2 is inserted in the mold, molten high-temperature resin for molding the plastic lens is injected into the mold. At this time, if the holder 2 is made of polycarbonate, the polycarbonate has a high glass transition temperature. Therefore, the holder 2 hardly elutes even if receiving heat from high temperature resin (sometimes referred to as lens resin in this specification) injected for molding the plastic lens. This makes it possible to suppress deformation due to heat during lens molding. In addition to this, a material containing ABS blend, polycarbonate, ABS, PS or PMMA in an amount of 10% by weight or more can be used. Alternatively, a material containing 10 wt % or more of a composite material of polycarbonate, ABS, PS or PMMA can be used.

In addition, the holder preferably has a light shielding function. This makes it possible to suppress ghost. For example, if a material containing a black dye is selected, the holder can have a light shielding function. When a transparent resin is selected as the material of the holder, a sanitizing step by magic or the like may be required in order to apply a light shielding function in a later step, which causes a cost increase. Further, if a material mixed with a containing material such as a glass filler is selected as the material of the holder, strength can be imparted to the holder. For example, a material containing a containing material such as glass filler in an amount of 10% by weight or more and 30% by weight or less with respect to the whole weight of the holder, and having a molding contraction rate that is 0.3% or more smaller than that of the lens resin is preferable. The containing material may be a carbon filler or another inorganic material as long as the containing material is a material incompatible with the resin. The containing material is preferably a reinforcing fiber. Depending on the weight content of the containing material, mechanical strength, molding contraction rate, and surface smoothness change. Also, depending on the fiber length of the containing material, even at the same weight content, mechanical strength, molding contraction rate, and surface smoothness change. It is preferable that the fiber shape and the content are selected not only by the molding contraction rate but also by the strength and the surface property required for the product.

In addition, the content of the containing material (reinforcing fiber) in the material forming the holder is preferably 10% by weight or more and 50% by weight or less. If the content of the containing material exceeds 50% by weight, the fluidity becomes low. If the content of the containing material is less than 10% by weight, the mechanical strength of the material becomes low.

For the plastic lens, a material including polycarbonate, polymethylmethacrylate, or cycloolefin polymer can be used. In addition, for the plastic lens, a material including a copolymer of cycloolefin and α-olefin, polystyrene, a copolymer of styrene and methyl methacrylate, or a fluorene-based polyester can also be used.

However, it is preferable to select one having a lower heat resistance than the holder material among the combination with the holder material. This makes it possible to suppress the deformation of the insert holder due to the heat generated at the time of molding the lens. In addition, it is preferable to select a lens material having low compatibility among materials, among combinations with a holder material. This is because in the case of a combination of compatible materials, if there is a biting portion, deformation of the lens surface tends to occur due to a difference in linear expansion, a difference in thermal contraction, and a difference in moisture absorption. For example, a resin material containing 50% by weight or more of cyclic olefin is preferable. Since the cyclic olefin resin material is nonpolar, compatibility with other resins is low, and when the resin material is insert molded, the resin material is not compatible with the holder resin at the interface. When the difference in solubility parameter (SP value) is large, a combination of resin materials having low compatibility and a difference in solubility parameter (SP value) of 0.5 or more is preferable.

Due to the difference in contraction after molding due to the difference between the material of the lens and the holder, the lens may receive a force from the holder in the vicinity of the biting portion. This force is proportional to the bite amount. The bite amount needs to be large enough so that the holder does not separate from the lens. However, if the bite amount is excessively larger than necessary, when the molded product is taken out from the mold after forming the lens, due to the difference in contraction between the holder and the lens, the lens distorts through the biting portion, and the shape error increases. Therefore, it is preferable that the average bite amount is 0.32 mm or less.

In the case of forming a lens having an outer shape symmetrical in the longitudinal direction with respect to an optical axis X as illustrated in FIGS. 1A and 1B, particularly when there is an asymmetric part in the longitudinal direction with respect to the optical axis X at the corner part of the holder, a local shape error occurs on the eyepiece side lens surface from the asymmetric part as a starting point.

When the molded product is taken out from the mold after forming the lens, a difference occurs in a contraction direction of the holder and the lens in the asymmetric part. Then, the force which the eyepiece side lens surface receives from the holder through the biting portion also becomes asymmetric, a local surface accuracy error part is generated, and the axial symmetry of the lens surface accuracy is lost.

A local surface accuracy error also becomes a factor of molding variation. If the axial symmetry of the lens surface accuracy breaks down, it is necessary to perform the free curved surface machining on the mold transfer surface at the time of correcting the surface accuracy. Compared with axially symmetric machining, free curved surface machining requires a dedicated processing machine and has a problem of high machining difficulty.

For this reason, it is preferable that the outer shape of the corner portion of the holder has high symmetry with respect to the optical axis in the same direction as the symmetrical direction of the lens outer shape.

Figure 2A:
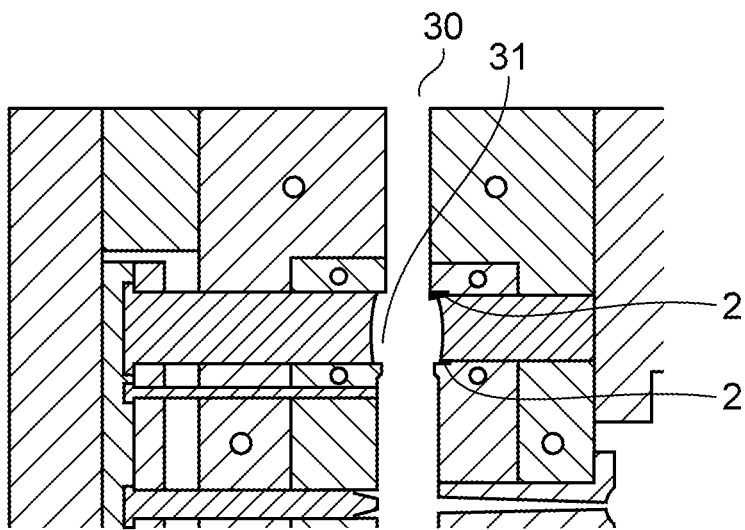
FIGS. 2A to 2C illustrate cross-sectional views of molds according to an example embodiment.
Figure 2B:
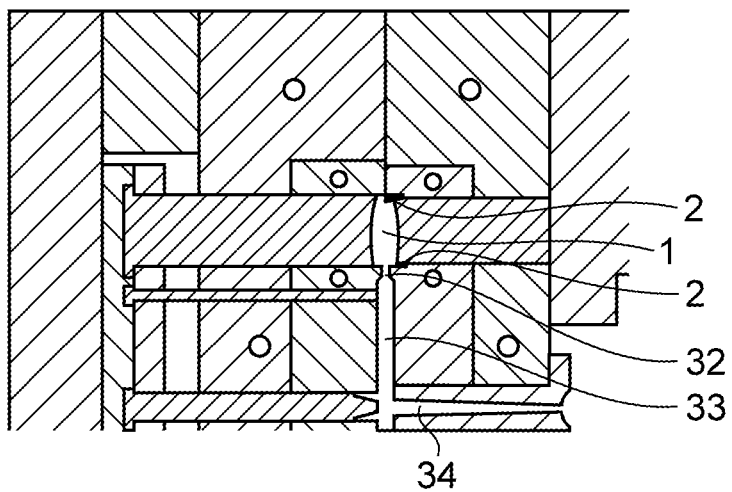
Figure 2C:
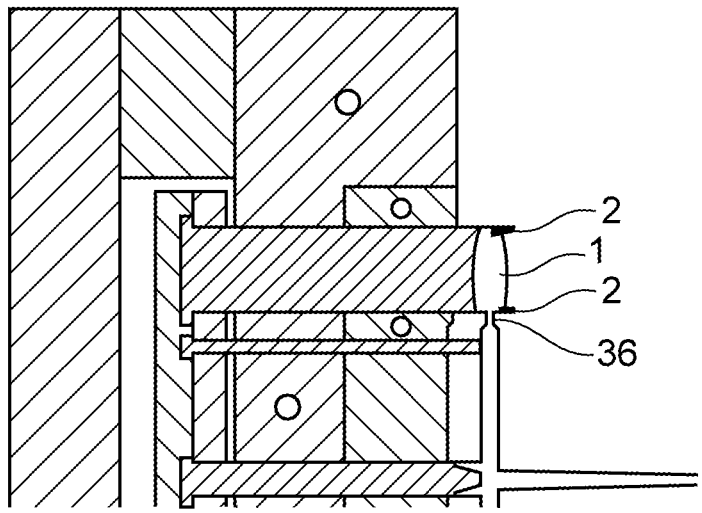

FIGS. 2A to 2C are cross-sectional views of a mold used as an example of a manufacturing method for manufacturing the optical part. FIG. 2A illustrates a state in which the holder 2 is inserted into a mold. FIG. 2B is a cross-sectional view of the mold before filling a cavity with a molten resin for molding a plastic lens. FIG. 2C is a cross-sectional view of the molding illustrating a state in which the mold is opened and the molded product is protruded after cooling and solidification.

In FIG. 2, a reference numeral 30 denotes a mold for optical part injection molding. A reference numeral 31 denotes a cavity of the mold. A reference numeral 32 denotes a gate portion of a mold for injecting a molten resin for molding a plastic lens into the cavity of the mold. A reference numeral 33 denotes a runner portion of the mold. A reference numeral 34 denotes a sprue portion of the mold. In the example embodiment, there is illustrated a mold for manufacturing an optical part having a plastic lens cut out at two portions of a circular shape as illustrated in FIGS. 1A to 1F. Therefore, the cavity 31 of the mold formed when the mold illustrated in FIG. 2B is closed is a void of a shape obtained by cutting out two portions of a circular shape. A shape for transferring a first optical surface, a second optical surface, and a plurality of side surfaces connecting the first optical surface to the second optical surface is formed. A hole connected to the runner 33, which is a gate 32, is formed in one of a plurality of side surfaces. It is not necessary to be an optical part having a plastic lens in which a part of the circular shape is cut out at two portions but the plastic lens may be circular. In other words, in the cavity of the mold for manufacturing the plastic lens, it is sufficient that a shape for transferring the first optical surface, the second optical surface, and the side surface connecting the first optical surface and the second optical surface is formed. In addition, it is sufficient that a hole connected to the runner 33, which is the gate 32, is formed on the side surface.

Next, a method for manufacturing the optical part will be described with reference to FIG. 2. The optical part 1 which is a holder-attached lens injects a molten resin (lens resin) for molding a plastic lens in a state where the holder 2 is inserted into the mold. Then, by making the lens resin reach a part of the holder, the lens can be fixed to the holder after the lens resin solidifies. That is, the biting portion which is a part of the holder is arranged in a state of protruding into the cavity, and the lens resin reaches the biting portion (a part of the holder bites into the lens). Accordingly, it is possible to fix the lens to the holder without fixing with the adhesive.

FIG. 2A illustrates a state in which the holder 2 is inserted into the mold for manufacturing the optical part. There is no particular limitation on the method for manufacturing the holder 2 to be inserted; however, it is convenient to perform injection-molding in advance using a metal mold (not illustrated). When the holder is inserted into the mold 30, if the holder is directly held in contact with the mold part, it is unnecessary to provide a separately holding mechanism and the structure of the mold can be simplified.

Next, the mold 30 is closed, and the lens resin is made to flow into the cavity 31 through the sprue 34, the runner 33, and the gate 32 in order. FIG. 2B illustrates a cross-sectional view of the mold before the cavity 31 is filled with the lens resin.

At this time, the holder is inserted so that a part of the holder protrudes into the cavity along the surface for transferring the side surface, which is formed when the mold is closed. Then, the amount of protrusion of the portion of the holder closest to the hole of the gate 32 formed on the surface for transferring the side surface to the cavity is made smaller than the average amount of protrusion of the holder into the cavity. The average amount of protrusion of the holder into the cavity is defined as a value obtained by dividing the total area of the inner surface of the holder protruding into the cavity by the length of the outer periphery on the parting line of the cavity shape to which the plastic lens is transferred. At this time, the length of the outer periphery of the cross-sectional shape excluding the gate is taken.

The total area of the holder protruding into the cavity is the total area of the inner surface of the holder biting into the plastic lens after molding. In other word, the total area of the inner surface of the holder protruding into the plastic lens refers to the total area of the inner surface of the holder biting into the lens, indicated as the bite amount 13 of the holder into the plastic lens when viewed from the optical axis direction.

If the amount of protrusion of the holder close to the gate into the cavity of the holder is large, the biting portion 3 (see FIGS. 1D to 1F) of the holder is deformed by the pressure and heat received from the molten lens resin before the lens resin reaches the biting portion 3 (see FIGS. 1D to 1F). Also, since the deformation shape varies from shot to shot, the accuracy of the molded product becomes unstable. If the amount of protrusion of the holder closest to the hole of the gate 32 to the cavity is made smaller than the average value, the deformation of the biting portion 3 is suppressed and the quality of the lens is not affected.

In the case of a mold for manufacturing an optical part having a plastic lens cut out in two portions of a circular shape, a part of the holder is inserted so as to protrude into the cavity along a surface for transferring a plurality of side surfaces. Among the plurality of surfaces for transferring a plurality of side surfaces, the holder inserted along the surface of the gate 32 where the hole is formed is set to have the amount of protrusion to the cavity smaller than that of the holder which is inserted along a surface for transferring another adjacent side surface.

If the amount of protrusion of the surface having the gate is large, before the lens resin reaches the biting portion 3 (see FIGS. 1D to 1F), the biting portion 3 of the holder is deformed by the pressure and heat received from the molten lens resin (see FIGS. 1D to 1F). Also, since the deformation shape varies from shot to shot, the accuracy of the molded product becomes unstable. If the amount of protrusion of the holder inserted into the cavity formed along the surface of the gate 32 into the cavity is reduced, deformation of the biting portion 3 is suppressed and the quality of the lens is not affected.

After the resin is cooled by a cooling water pipe installed in the mold, the optical part can be obtained through a mold opening step and a protruding step illustrated in FIG. 2C.

Next, examples will be described.

First Example

The optical part 1 illustrated in FIGS. 1A to 1F was manufactured. As the optical part 1, for example, a lens which is a finder of a digital single lens reflex camera and used as a diopter adjusting lens was manufactured.

First, the holder 2 was molded using a mold (not illustrated). As the mold, a mold having a cavity machined so that the bite amount 13 of the biting portion 3 of the holder of the surface for transferring the side on which the gate is disposed was 0.03 mm, and the bite amount 13 of the surface for transferring the other side surface was 0.3 mm was used. The cavity was machined so that a longitudinal width 14 of the optical part was 28 mm and a lateral width 16 of the optical part was 14 mm.

The outer shape of the holder was almost similar to the lens shape, and had a shape in which a holder corner portion 54 has high symmetry in the longitudinal direction with respect to the optical axis X.

As a material of the holder, 20% of glass filler and polycarbonate mixed with black dye were used.

Next, a mold for molding a biconvex lens in which the holder is inserted, and a longitudinal width 15 of the lens is 20 mm was prepared, the biconvex lens having a rectangular shape with a part of a circular shape cut away, as viewed from a top, and having a center thickness 17 of 5 mm.

Next, as illustrated in FIG. 2A, the holder 2 was inserted into the prepared mold 30, the mold was placed in a mold closed state as illustrated in FIG. 2B, and the lens resin was allowed to flow through the sprue 34, the runner 33, and the gate 32 in this order. A cycloolefin polymer was used as a material of the lens resin. After the resin was cooled by a cooling water pipe installed in the mold, the optical part was obtained through a mold opening step and a protruding step illustrated in FIG. 2C. The obtained plastic optical part 1 was highly precise with deformation of the holder suppressed. Specifically, a high-precision optical part having a shape error of 2 μm or less was obtained in the entire lens effective region including the vicinity of the gate. In addition, a molding variation was also good.

Second Example

Figure 3A:
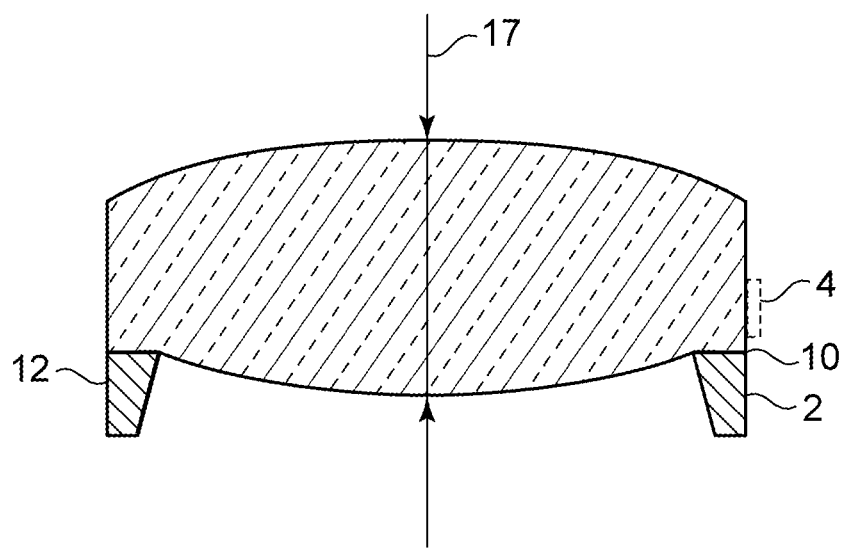
FIGS. 3A and 3B each illustrate an optical part according to a second example embodiment.
Figure 3B:
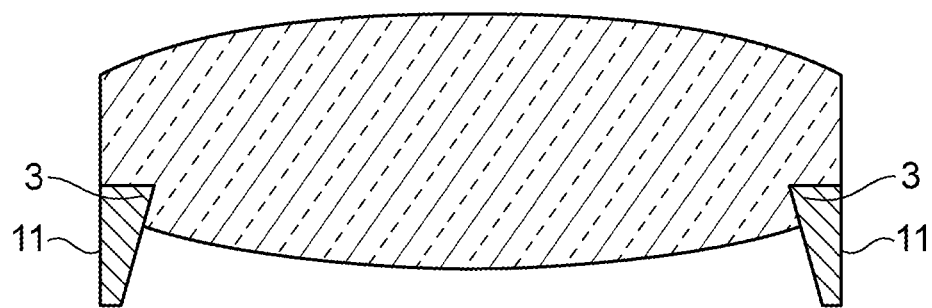

The optical part illustrated in FIGS. 3A and 3b was manufactured. FIG. 3A is a cross-sectional view cut along a plane including the lens optical axis and parallel to the optical axis. FIG. 3B is a cross-sectional view taken along a plane perpendicular to the cross section of FIG. 3A cut along a plane including the lens optical axis and parallel to the optical axis. Parts having the same functions as those in FIGS. 1A to 1F are denoted by the same reference numerals, and a detailed description thereof will be omitted.

First, the holder 2 was molded using a mold (not illustrated). As the mold, a mold having a cavity machined so that the bite amount 13 of the biting portion 3 of the holder at a surface for transferring the side surface on which the gate is disposed and a surface for transferring the opposite side surface is 0.03 mm was used. Further, a mold having a cavity machined so that the bite amount 13 of the surface for transferring the other side surface was 0.3 mm was used. The cavity was machined so that a longitudinal width 14 of the optical part was 28 mm and a lateral width 16 of the optical part was 14 mm.

As a material of the holder, 20% of glass filler and polycarbonate mixed with black dye were used.

Next, a mold for molding a biconvex lens in which the holder is inserted, and a longitudinal width 15 of the lens is 20 mm was prepared, the biconvex lens having a rectangular shape with a part of a circular shape cut away, as viewed from a top, and having a center thickness 17 of 5 mm.

Next, as illustrated in FIG. 2A, the holder 2 was inserted into the prepared mold 30, the mold was placed in a mold closed state as illustrated in FIG. 2B, and the lens resin was allowed to flow through the sprue 34, the runner 33, and the gate 32 in this order. A cycloolefin polymer was used as a material of the lens resin. After the resin was cooled by a cooling water pipe installed in the mold, the optical part was obtained through a mold opening step and a protruding step illustrated in FIG. 2C. The obtained plastic optical part 1 was highly precise with deformation of the holder suppressed. Specifically, a high-precision optical part having a shape error of 2 μm or less was obtained over the entire lens effective region including the vicinity of the gate of an optical surface (back) 6. In addition, a molding variation was also good.

Third Example

In manufacturing the optical part 1 illustrated in FIGS. 1A to 1F, in the holder 2, the bite amount 13 of the biting portion 3 of the holder of the surface for transferring the side surface on which the gate is disposed was 0.03 mm, and the average bite amount of the surface for transferring the other side surface was 0.32 mm.

The shape and material of the other holder, lens shape and material were the same as in the first example, and the optical part was obtained by the same manufacturing method as illustrated in the first example.

Compared to the optical part obtained in the first example, the resulting plastic optical part had increased shape error of the optical surface (back) 6 and molding variation of shape error; however, the design standard can be satisfied.

Compared to the first example, due to a contraction difference caused by a material difference between the lens resin and the holder resin generated after taking out the mold, as the bite amount is large, the lens portion in the vicinity of the biting portion becomes more susceptible to force from the holder via the biting shape. As a result, both the shape error and the molding variation of the lens surface were increased.

Comparative Example 1

Figure 4A:
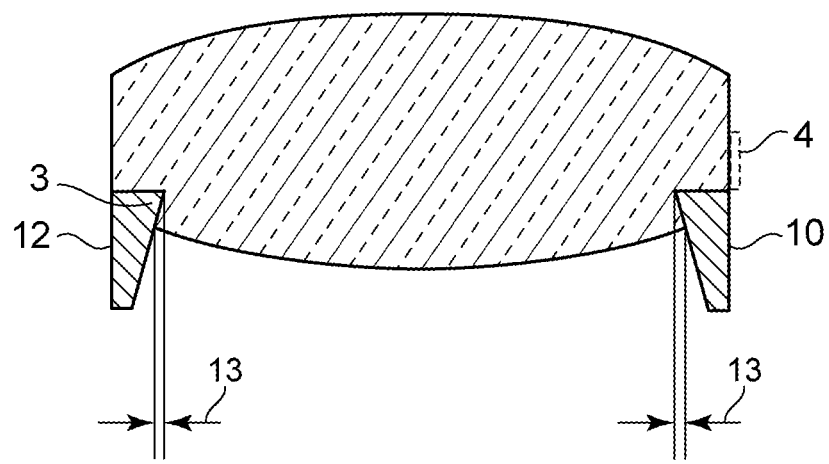
FIGS. 4A and 4B each illustrate an optical part in a comparative example.
Figure 4B:
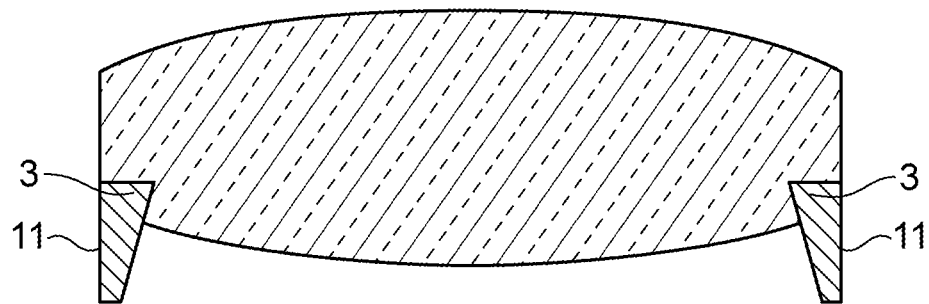

The optical part illustrated in FIGS. 4A and 4B was manufactured. FIG. 4A is a cross-sectional view taken along a plane including the lens optical axis and parallel to the optical axis. FIG. 4B is a cross-sectional view taken along a plane perpendicular to the cross section of FIG. 4A cut along a plane including the lens optical axis and parallel to the optical axis. Parts having the same functions as those in FIGS. 1A to 1F are denoted by the same reference numerals, and a detailed description thereof will be omitted.

First, the holder 2 was molded using a mold (not illustrated). A mold having a cavity machined so that the bite amount 13 of the biting portion 3 of the holder at all surfaces for transferring the side surface of the plastic lens is 0.3 mm was used. The cavity was machined so that a longitudinal width 14 of the optical part was 28 mm and a lateral width 16 of the optical part was 14 mm.

As a material of the holder, 20% of glass filler and polycarbonate mixed with black dye were used.

Next, a mold for molding a biconvex lens in which the holder is inserted, and a longitudinal width 15 of the lens is 20 mm was prepared, the biconvex lens having a rectangular shape with a part of a circular shape cut away, as viewed from a top, and having a center thickness 17 of 5 mm.

Next, as illustrated in FIG. 2A, the holder 2 was inserted into the prepared mold 30, the mold was placed in a mold closed state as illustrated in FIG. 2B, and the lens resin was allowed to flow through the sprue 34, the runner 33, and the gate 32 in this order. A cycloolefin polymer was used as a material of the lens resin. After the resin was cooled by a cooling water pipe installed in the mold, the optical part was obtained through a mold opening step and a protruding step illustrated in FIG. 2C.

The obtained optical part had large deformation of the molded product and was not satisfactory in optical performance. Specifically, the surface accuracy (mainly partial curvature error) in the vicinity of the gate of the lens optically effective area failed to satisfy the design standard, and molding variation was not acceptable.

The amount of protrusion of the holder into the cavity is large on a surface on which the gate is disposed, the surface being configured to transfer the side surface. Therefore, the biting portion 3 is also large. For this reason, it is considered that the biting portion 3 (see FIGS. 1D to 1F) of the holder was deformed by pressure and heat received from the molten lens resin.

Fourth Example

Figure 5A:
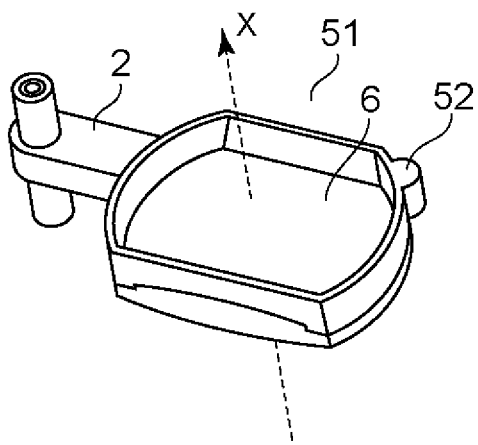
Figure 5B:
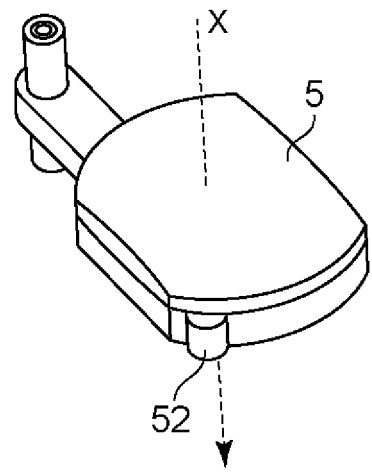
Figure 5C:
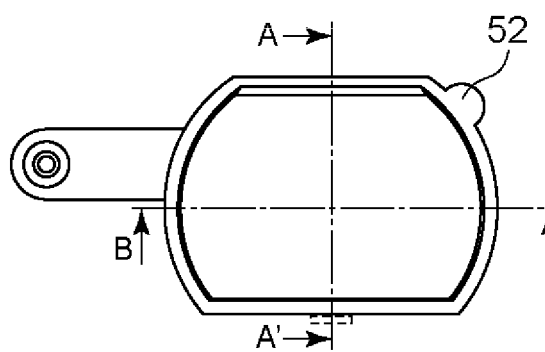
Figure 5D:
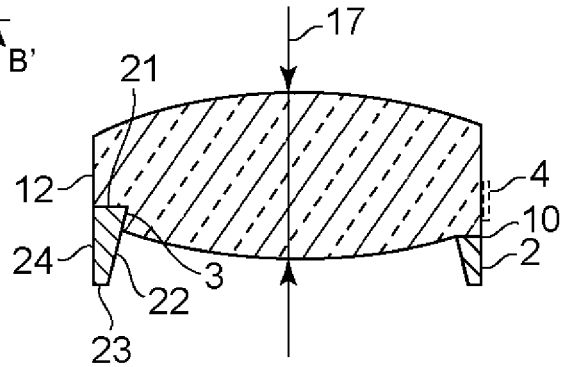
Figure 5E:
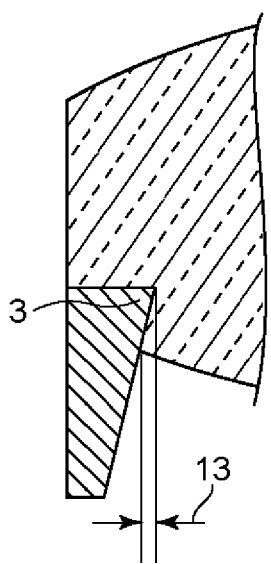
Figure 5F:
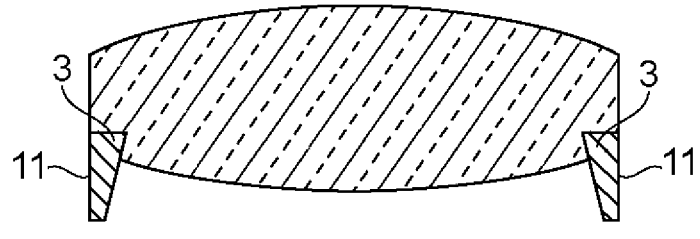

The optical part 51 illustrated in FIGS. 5A to 5F was manufactured. FIG. 5A is a top perspective view. FIG. 5B is a bottom perspective view. FIG. 5C is a top view. FIG. 5D is a cross-sectional view taken along a line A-A' including a lens optical axis and parallel to the optical axis. FIG. 5E is an enlarged view of a biting portion. FIG. 5F is a cross-sectional view taken along a section B-B', which is different from FIG. 5D cut along a plane including the lens optical axis and parallel to the optical axis.

Compared with the optical part illustrated in FIGS. 1A to 1F, the optical part illustrated in FIGS. 5A to 5F has an asymmetric part 52 added to the corner of the holder. Furthermore, the bite amount 13 of the biting portion 3 of the holder of the surface for transferring the side surface on which the gate is disposed was 0.03 mm, and the average bite amount of the surface for transferring the other side surface was 0.44 mm.

Except for this, detailed description is omitted because the optical part 51 has a shape common to that in FIGS. 1A to 1F. The material of the holder, lens shape and material were the same as in the first example, and the optical part was obtained by the same manufacturing method as illustrated in the first example.

Compared with the optical part obtained in the first example, in the obtained plastic optical part, the shape error of the optical surface (back) 6 and the molding variation of the shape error increased.

Compared with the optical part illustrated in FIGS. 1A to 1F, due to a contraction difference caused by a material difference between the lens resin and the holder resin generated after taking out the mold, as the bite amount is large, in the optical part illustrated in FIGS. 55A to 5F, the lens portion in the vicinity of the biting portion becomes more susceptible to force from the holder. In addition, it is considered that asymmetry of the outer shape of the holder with respect to the optical axis is high, partial shape error increases accordingly, and molding variation becomes larger than that in the first example embodiment.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2016-150333, filed Jul. 29, 2016, and 2017-129346, filed Jun. 30, 2017, which are hereby incorporated by reference herein in their entirety.

What is claimed is:

1. An optical part comprising:
a plastic lens having a side surface connecting a first optical surface and a second optical surface, between the first optical surface and the second optical surface; and
a holder, wherein:
the plastic lens is fixed by a holder biting into the plastic lens,
the side surface of the plastic lens has a gate trace, and a bite amount into the plastic lens of the holder closest to the gate trace is smaller than a bite amount of the holder on a side surface adjacent to the side surface having the gate trace, or the holder closest to the gate trace does not bite into the plastic lens.

2. The optical part according to claim 1, wherein the lens is an eyepiece lens and has an eyepiece side lens surface and an objective side lens surface, and the holder bites into the eyepiece side lens surface.

3. The optical part according to claim 1, wherein a material forming the holder is a material including reinforcing fiber in a material including polycarbonate, ABS, PS, PMMA, or a composite material thereof.

4. The optical part according to claim 3, wherein a content of the reinforcing fiber in the material forming the holder is 10% by weight or more and 50% by weight or less.

5. The optical part according to claim 1, wherein an average bite amount into the plastic lens is smaller than 0.32 mm.

6. The optical part according to claim 1, wherein the material forming the plastic lens comprises a cyclic olefin.

7. A camera comprising the optical part according to claim 1.

8. A method for manufacturing an optical part, comprising:
inserting a holder into a mold;
injecting a molten resin from a gate into a cavity; and
molding a plastic lens, wherein:
the cavity has a surface for transferring a first optical surface, a second optical surface, and a side surface connecting the first optical surface and the second optical surface,
the gate is formed on the surface for transferring the side surface, and the insertion of the holder is performed so that a protrusion amount of a portion of the holder closest to the gate from the surface for transferring the side surface is smaller than a bite amount of the holder on a surface adjacent to the surface having the gate, or the holder closest to the gate does not protrude from the surface for transferring the side surface.

9. The method for manufacturing an optical part according to claim 8, wherein the molten resin has a difference in solubility parameter (SP value) of 0.5 or more with the material forming the holder.

* * * * *